(12) United States Patent
Sizer, II et al.

(10) Patent No.: US 6,380,866 B1
(45) Date of Patent: *Apr. 30, 2002

(54) SYSTEM AND APPARATUS FOR CONTROLLING AN APPLIANCE SITUATED WITHIN A PREMISES

(75) Inventors: Theodore Sizer, II, Little Silver; Gregory Alan Wright, Colts Neck, both of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/486,544

(22) Filed: Jun. 8, 1995

(51) Int. Cl.[7] ................................................. H04Q 9/00
(52) U.S. Cl. .................................. 340/825.69; 340/3.9
(58) Field of Search ..................... 340/825.69, 825.72, 340/825.24, 3.1, 3.9; 370/402; 359/145; 379/102.3; 219/448

(56) References Cited

U.S. PATENT DOCUMENTS

| | | | | |
|---|---|---|---|---|
| 4,855,730 A | * | 8/1989 | Venners et al. | 340/825.24 |
| 4,885,766 A | * | 12/1989 | Yasuoka | 379/102.3 |
| 5,109,222 A | * | 4/1992 | Welty | 340/825.72 |
| 5,227,780 A | * | 7/1993 | Tigwell | 340/825.72 |
| 5,321,229 A | * | 6/1994 | Holling | 219/448 |
| 5,383,044 A | * | 1/1995 | Borchardt | 359/145 |
| 5,452,291 A | * | 9/1995 | Eisenhandler | 370/402 |

* cited by examiner

Primary Examiner—Edwin C. Holloway, III

(57) ABSTRACT

A system and apparatus for controlling an appliance situated within a premises such as a home or office has a premises controller for receiving and storing appliance control information. The premises controller includes a wireless transmitter for generating and transmitting a packet of appliance control information to an appliance controller based on the stored appliance control information. In one aspect of the invention, the appliance controller is spaced from the premises controller but within range of the generated packet transmission for interfacing with the premises appliance. The appliance controller further includes a packet receiver for receiving the packet of control information. In one aspect of the invention, the premises controller has a microprocessor. An infrared pulse generator is operatively connected to the microprocessor and generates and transmits an infrared pulse code to the appliance.

20 Claims, 5 Drawing Sheets

SYSTEM AND APPARATUS FOR CONTROLLING AN APPLIANCE SITUATED WITHIN A PREMISES

This application is related to copending patent application entitled "System and Apparatus For Controlling An Appliance Situated Within A Premises Using A Premises Recording Unit", application Ser. No. 08/486,543, filed Jun. 8, 1995, which issued on Feb. 1, 2000 as U.S. Pat. No. 6,021,324 hereof by the same inventor.

FIELD OF THE INVENTION

This invention relates to a system and apparatus for controlling an appliance situated within a premises, such as a home or office.

BACKGROUND OF THE INVENTION

It has been proposed to use a premises recording unit connected to a telephone network for controlling appliances situated within a premises such as a home or office. Information necessary for controlling appliance operation could be downloaded via the telephone network, through separate cartridges, a disk, or contained in preprogrammed ROM. Additionally, a local bus would provide expansion functions such as the addition of modem and game cartridges as well as a packet transmitter cartridge for transmitting control signals to an appliance for controlling operation of the appliance within the premises.

It would be desirable to control appliances situated within the premises without using a premises recording unit. These appliances would include not only radio controlled appliances, such as off-on switches for door locks, but infrared controlled appliances such as stereos and VCR's. It would be desirable if a low cost, low power, battery operated link could be established between a premises controller and an appliance for controlling appliance operation without complex premises recording units and packet transmitters connected to microprocessor buses or positioned within recording units as a separate cartridge.

SUMMARY OF THE INVENTION

The present invention is advantageous because control of appliances situated within a premises such as a home or office can be achieved by a separate premises controller which receives and stores appliance control information and transmits that information to an appliance controller which controls appliance operation. The premises controller includes a wireless transmitter for generating and transmitting a packet of appliance control information to the appliance controller based on the stored information within the premises controller.

The appliance controller is spaced from the premises controller but within range of the generated packet transmission for interfacing with the premises appliance. The appliance controller further includes a packet receiver for receiving the packet of transmitted information, processing that information, and then controlling operation of the appliance through the packet data.

In one aspect of the present invention, the appliance controller is spaced from the packet transmitter of the premises controller and includes a microprocessor. A radio transmitter delivers a packet of digital information to the appliance controller and microprocessor. An infrared pulse generator is operatively connected to the microprocessor for receiving the pulse code and generating and transmitting an infrared pulse code by means of an LED.

The appliance controller further includes ROM and radio detection circuitry as well as amplifiers. Conversion data to convert a radio data sequence to an infrared pulse sequence is contained within the ROM. This conversion can be tailored to different manufacturers, allowing a unique infrared packet sequence, which results in a similar response for any manufacturer's appliance. Thus, the appliance controller receives a radio packet control signal, and then generates an infrared pulse sequence for controlling an appliance such as a VCR or stereo, which often are controlled via infrared pulse sequences. The radio transmitter can be spaced outside the premises, as long as the appliance controller is near the appliance.

The wireless transmitter further includes a circuit board and a patch antennae mounted on the circuit board through which the packet transmission is generated. The packet of control information can include an address portion and a payload portion. In different aspects, of the present invention, the wireless transmitter can generate a packet radio signal to the appliance controller, an infrared signal or an ultrasonic signal. The packet receiver is designed to receive the respective type of generated signal.

In still another aspect of the present invention, the appliance controller includes a system for generating a signal back to the premises controller relating to appliance operation. This in effect forms a closed loop control circuit. The premises controller is responsive to this generated signal and can generate and transmit further control information to the appliance controller in response.

DESCRIPTION OF THE DRAWINGS

The foregoing and other features and advantages of the present invention will be appreciated more fully from the following description, with reference to the accompanying drawings in which.

DETAILED DESCRIPTION OF THE INVENTION

Figure 1:
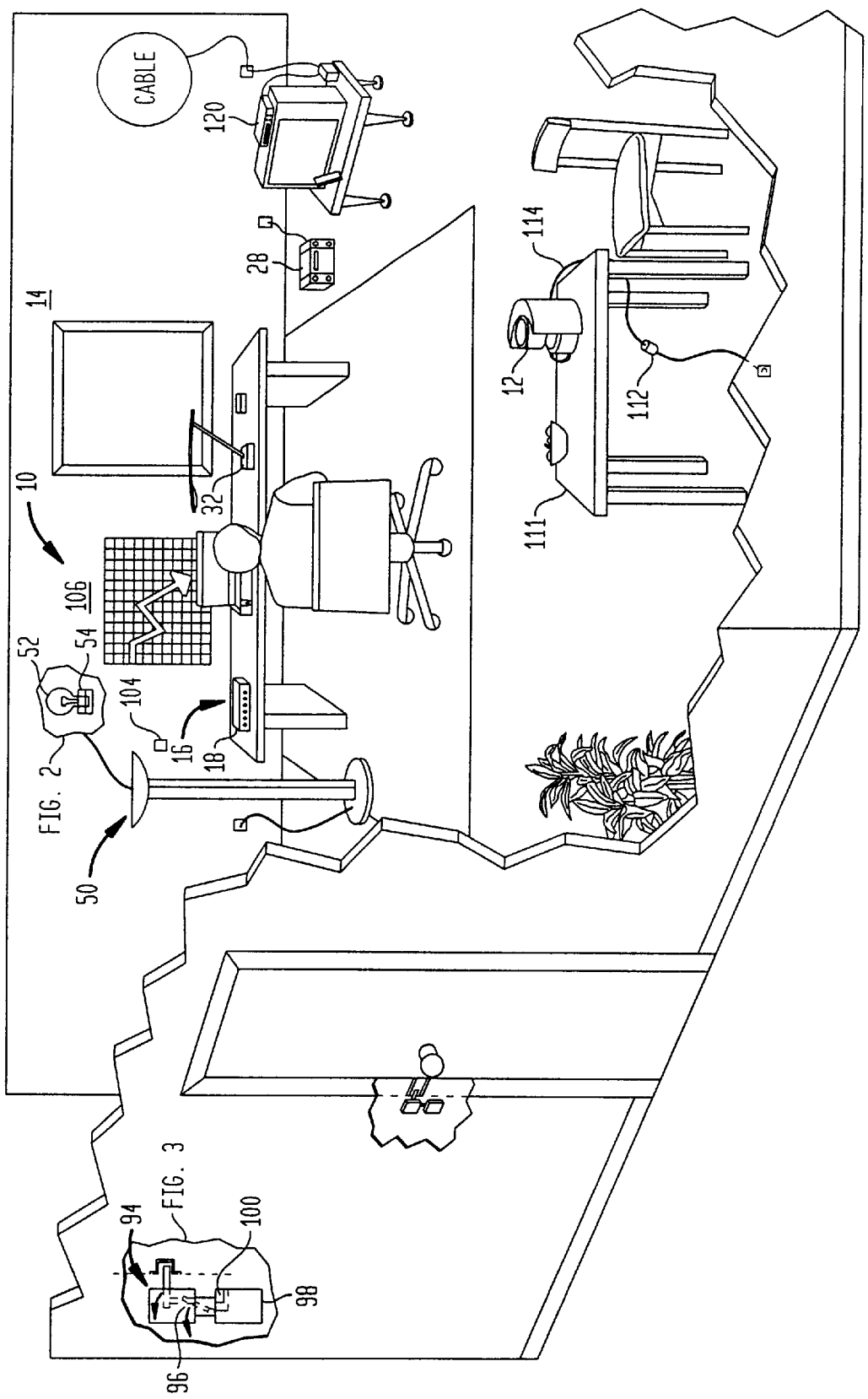
FIG. 1 is an environmental view of the system and apparatus of the present invention and shows control of lights, door locks, coffee pot, VCR and stereo via a central premises controller stationed on a desk and in easy access of a user.

Referring now to FIG. 1, there is illustrated generally at 10 a system of the present invention for controlling an appliance, such as a coffee maker 12 situated within a premises such as a home or office, indicated generally at 14. In the illustrated embodiment, a premises controller 16 is positioned on a desk and controls a variety of different appliances situated within the premises 14 as shown in FIG. 1.

Figure 4:
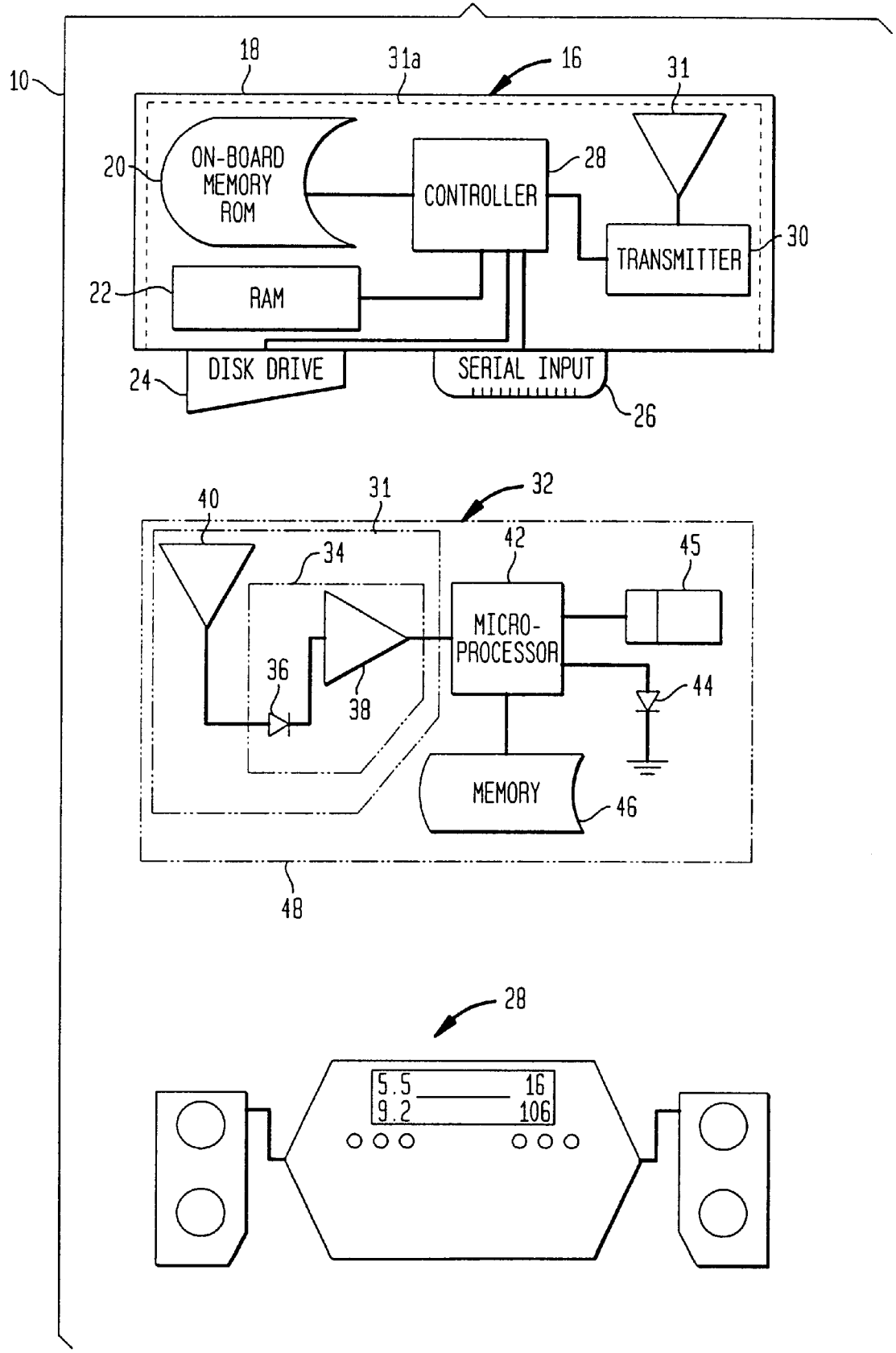
FIG. 4 is a high level block diagram showing a premises controller, and an appliance controller having an infrared generator.

As shown in FIGS. 1 and 4, the premises controller 16, in accordance with the present invention, is contained within an aesthetically designed housing 18, and receives and stores appliance control information which is specifically designated for control of a particular appliance. Typically this appliance control information is stored on a simple on-board memory 20 such as ROM. In another aspect of the present invention, the appliance control information is input into RAM 22 via a disk drive 24 or serial data input connection 26. A controller, 28 typically a microprocessor, processes the information and generates via a radio transmitter 30 connected thereto the packet signals which are transmitted via on-board antennae 31. All components can be contained on one circuit board 31a.

FIG. 4 illustrates one embodiment where an appliance such as a stereo 28, is controlled by an infrared signal. Typical appliances controlled by signals infrared include VCR's and stereos. In this embodiment, a radio transmitter 30 of the premises controller 16 delivers a radio packet of digital information corresponding to the desired appliance control information to a separate and remote packet receiver 31 subset which acts as an appliance controller 32. This controller 32 has a detector circuit, indicated at 34, which may include a diode 36 and an amplifier 38. A patch antennae 40 receives the packet radio signals. The amplified signals are sent to a microprocessor 42, which receives the digital signal and then retransmits the information by an infrared LED 44 as an infrared pulse sequence to the stereo 28 to be controlled.

FIG. 4 illustrates one embodiment where an appliance such as a stereo 28, is controlled by an infrared signal. Typical appliances controlled by signals infrared include VCR's and stereos. In this embodiment, a radio transmitter 30 of the premises controller 16 delivers a radio packet of digital information corresponding to the desired appliance control information to a separate and remote packet receiver 31 subset which acts as an appliance controller 32. This controller 32 has a detector circuit, indicated at 34, which may include a diode 36 and an amplifier 38. A patch antennae 40 receives the packet radio signals. The amplified signals are sent to a microprocessor 42, which receives the digital signal and then retransmits the information by an LED 44 as an infrared pulse sequence to the stereo 28 to be controlled. Conversion data converts the radio data sequence to an infrared pulse sequence. The conversion data can be stored in a simple on-board memory 46 and can be easily tailored to different manufacturers pulse sequences allowing a unique radio packet sequence which results in a similar response for any manufacturer's appliance, such as a specific VCR or stereo. Conversion data converts the radio data sequence to an infrared pulse sequence. The conversion data can be stored in a simple on-board memory 46 (such as ROM) and can be easily tailored to different manufacturers'pulse sequences allowing a unique radio packet sequence which results in a similar response for any manufacturer's appliance, such as a specific VCR or stereo.

In one aspect of the invention, the detected radio signal could directly modulate the infrared LED 44 with no conversion at all. All components including the patch antennae 40, are contained on one circuit board 48. Since the appliance controller 32 is placed within signal range of the appliance to be controlled, little optical power would be required. Thus, a low-cost, low-power, battery operated link would be established.

Figure 2:
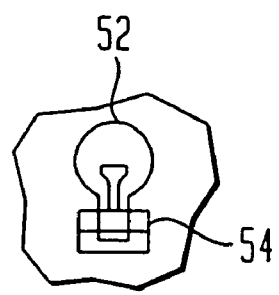
FIG. 2 is an enlarged view of a bulb screwed into a series connection appliance controller.

In another embodiment, the appliance controller 32 is physically interfaced with the appliance to be controlled. For example, in a simple pole lamp 50, as shown in FIGS. 1 and 2, the light bulb 52 is screwed within a series connection appliance controller 54 and acts as an on-off controller for current. The appliance controller 54 includes the packet receiver 31 and associated components for receiving the radio signals and switching the light off and on.

The radio transmitter 30 of the premises controller preferably works in an operating frequency of about 2.45 GHz to about 6.0 GHz for generating radio packet signals. This large range of operating frequency is desirable because it is presently unlicensed, underpopulated, and requires only a very small transmitting antennae and receiving antennae which are attached directly to a circuit board.

Figure 5:
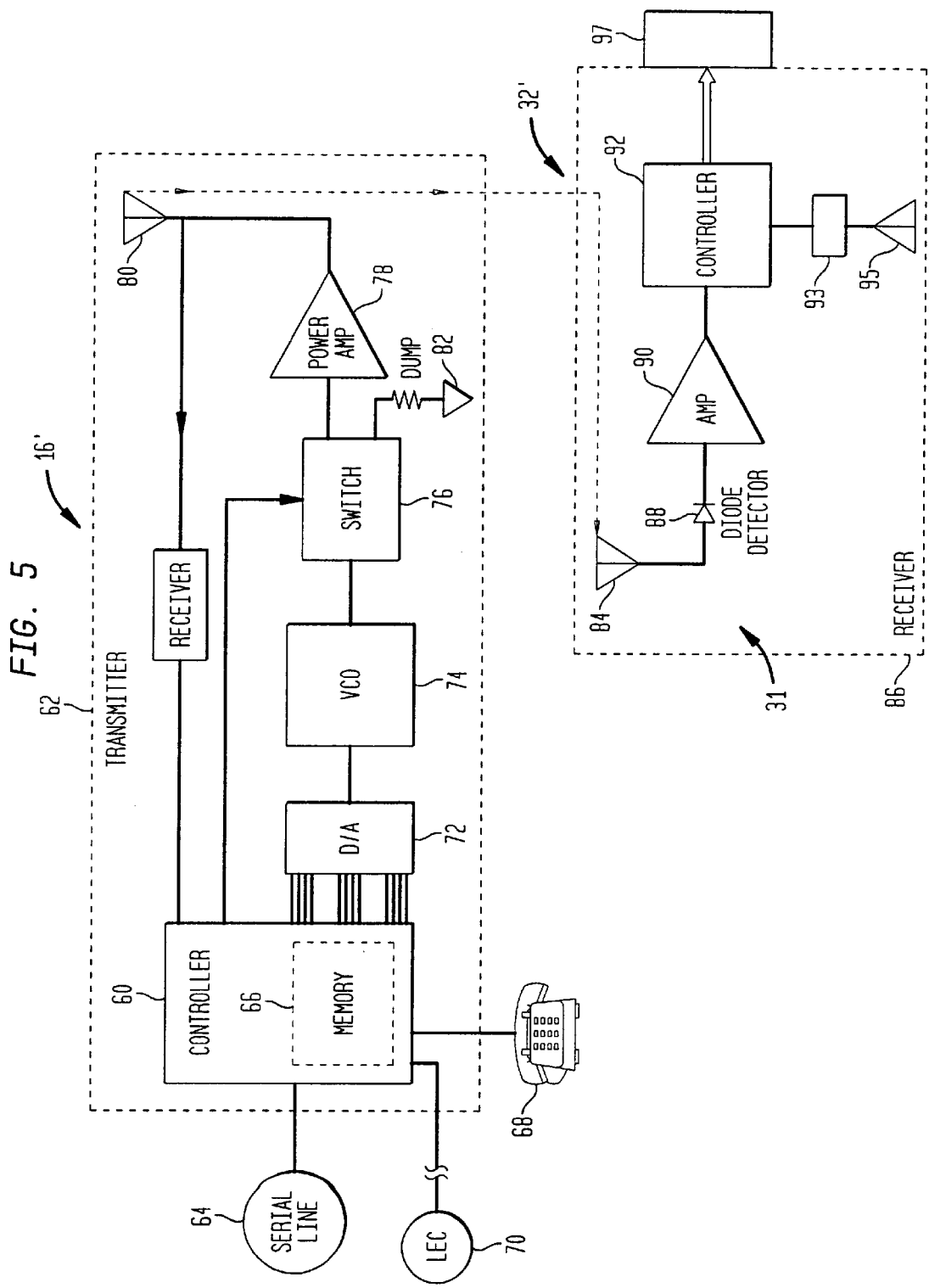
FIG. 5 is a high level block diagram of a transmitter and packet receiver used with the system of the present invention.

Referring now to FIG. 5, there is illustrated another embodiment of a premises controller 16' and appliance controller 32' which can be used with the present invention. Similar reference numerals of the second embodiment to the first are set forth in prime notation. As shown in FIG. 5, an electronic controller 60, typically a microprocessor, is positioned on a circuit board 62. A serial line 64 can be connected into the electronic controller 60 and can receive information such as from a modem or other source. Appliance control information is received from the electronic controller 60 as part of the program contained within the on-board memory 66 or from a premises phone 68 or even the phone network 70. The controller 60 inputs signals directly to a digital to analog (D/A) converter 72 and then to a voltage controlled oscillator (VCO) 74 and then into a switch 76. From the switch 76, the signal is then transmitted to a power amplifier 78 which then amplifies the signal for transmission to the appliance controller 32 via an antennae 80 positioned on the circuit board 62. Extraneous signals can be dumped via circuit 82.

The transmitted signal is then sent to the packet receiver 31 of the appliance controller 32 and received by the receiver antennae 84 positioned on a circuit board 86. The received signal is then forwarded to a diode detector 88 which rectifies the signal. The signal is then amplified by a power amplifier 90 and sent to an electronic controller 92, typically a microprocessor, on appliance interface 97 such as that which drives an on-off switch as part of the series connection controller 54 for lights or coffee pot or any other type of device. Additionally, a separate transmitter 93 can transmit information via a separate antennae 95 back to a receiving antennae of a transmitter forming a closed loop control system.

Once generated and transmitted, the packet of control information contains an address portion corresponding to the appliance to be controlled, and a data portion containing the control information for the appliance controller. The address portion allows the appliance controller interfaced with the particular controlled appliance to receive the desired data.

FIG. 1 illustrates four separate appliances which are controlled by the premises controller 16 of the present invention.

Figure 3:
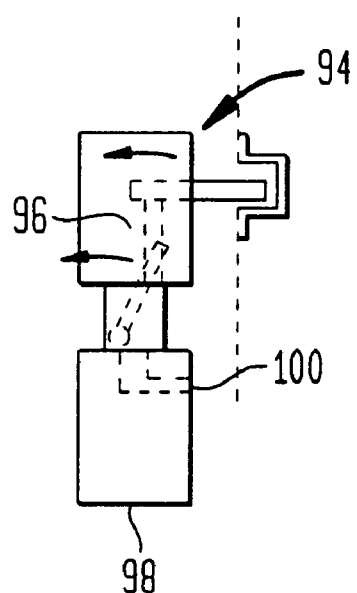
FIG. 3 is an enlarged schematic diagram of a lock and lock controller used for controlling locks on the entrance door.

The door lock 94 in FIG. 3 includes an electromechanical relay 96 connected to an appliance controller 98, which triggers the electromechanical relay when a radio packet control signal is received. With this type of door lock 94 and appliance controller 98, a packet radio signal is especially advantageous so that the controller can be triggered when there is no direct line of sight or ceiling bounce line of sight such as necessary with an infrared signal. The controller 98 can also include a transmitter 100 for generating a signal back to the premises controller 16 which signals the locked or unlocked condition of the entrance door, thus forming a closed loop control system. This would be advantageous for a home owner. If one is in bed upstairs, an initial lock instruction could be sent via the premises controller 16 to the door lock 94. The feedback signal would then verify if the door were locked.

Other appliances shown in FIG. 1 and controlled by the include a pole lamp 50 controlled by a switch 104 on the wall 106. In this particular embodiment, the switch 104 is left in its "on" state and the bulb 52 is screwed into the separate series connection appliance controller 54 which allows current flow to the bulb only when a packet control signal is transmitted.

A coffee maker 12 is positioned on a table 111 within the premises 17, and has a series connector appliance controller 112 positioned in the power cord 114. The coffee maker 12 is normally left on and the packet control signal operates the appliance controller 112 to allow current flow to the coffee maker 12.

The television VCR 120 and stereo 28 are controlled by off-on operation and also by means of an infrared pulse sequence such as programmed within the ROM of the controller described with reference to FIG. 4. The infrared pulse code sequence is a standard sequence for changing channels and controlling VCR and other operation.

Figure 6:
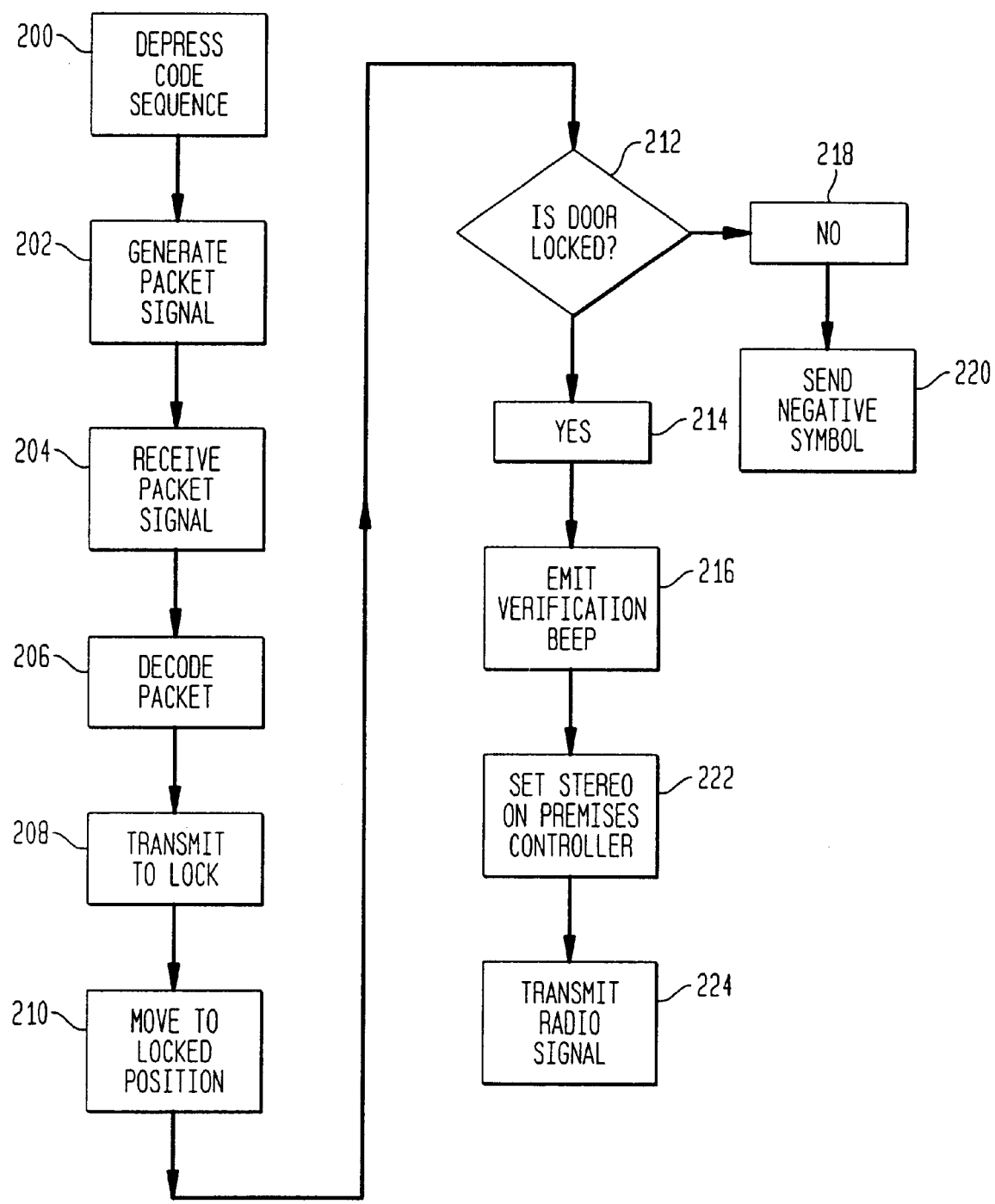
FIG. 6 is a high level flow chart depicting one sequence of possible steps when using the system of the present invention for controlling an appliance.

The flow chart of FIG. 6 illustrates the steps of one aspect of the invention. For purposes of understanding, the description will proceed relative to one locking the door from an upstairs bedroom of the premises, and then setting the stereo to pipe music in the morning. All references in the described flowchart begin with 200 Series numerals.

In accordance with the present invention, the user first depresses a code sequence corresponding to the appliance to be controlled and its function, in this case the door lock (Block 200). For example, the alphanumeric characters 8, 9, and 7 could be depressed, corresponding to a code sequence for locking the downstairs door. The premises controller then generates a radio signal with a proper packet of digital information to the packet receiver (Block 202) which then receives the radio packet signal (Block 204) and decodes the packet (Block 206). The decoded packet signal then transmitted to the electromechanical relay (Block 208) to move the lock in its locked position (Block 210). A second signal is then transmitted to the appliance controller queuing if the door is now locked (Block 212). If the door is locked (Block 214), the premises control unit could emit a beep or display "Door-Locked" on an LED display (Block 216). If the door is not locked, (Block 218) a different signal is sent noting the unlocked condition of the door (Block 220). Next, the sequence for setting the stereo to play in the morning could be entered (Block 222). The packet transmitter generates and transmits a radio packet signal to the appliance controller subset (Block 224), which in turn generates the proper infrared signal to set the stereo to play in the morning.

It is to be understood that the above description is only one preferred embodiment of the invention. Numerous other arrangements may be devised by one skilled in the art without departing from the scope or spirit of the invention.

That which is claimed is:

1. A system for controlling an appliance contained within a premises comprising:
   premises controller means for receiving and storing appliance control information, the premises controller means including radio transmission means for generating and transmitting a packet of appliance control information to the appliance based on the stored appliance control information;
   appliance controller means spaced from said premises controller means but within range of said generated packet transmission for interfacing with the appliance, said appliance controller means further including:
      means for receiving and translating said packet of appliance control information for controlling operation of the appliance; and
      means for generating a radio signal back to said premises controller means relating to operation of the appliance;
      responsive to the radio signal back, the premises controller means generating and transmitting a further packet of control information to the appliance controller for closed loop control of the appliance within the premises;
      wherein the premises controller interoperates wirelessly, in both directions, with appliance controllers out of the premises controller's line of sight.

2. The system according to claim 1 wherein said appliance control means further comprises:
   microprocessing means translating the packet of appliance control signals;
   wherein said premises control means further comprises:
      high frequency radio transmitting means for delivering the packet of appliance control information to said microprocessing means; and wherein said appliance control means further comprises:
         pulse generation means being operatively connected to said microprocessing means for receiving said translated packet of appliance control information and generating and transmitting an appliance control signal.

3. The system according to claim 1 wherein said appliance control means further includes ROM for storing various pulse sequences depending on the type of appliance to be controlled.

4. The system according to claim 1 wherein said radio transmission means further includes a antennae through which said transmitted packet of appliance control information is sent.

5. The system according to claim 1 wherein said packet of appliance control information includes an address portion and a payload portion.

6. The system according to claim 1 wherein said radio transmission means includes means for generating a packet radio signal in the range of 2.45 Ghz to about 6.0 Ghz to said appliance control means.

7. The system according to claim 1 wherein said premises control means includes processing means including ROM which stores said appliance control information.

8. A system for controlling the operation of appliances comprising:
   a premises having a plurality of appliances situated therein;
   premises controller means for receiving and storing appliance control information, and including radio transmission means for generating and transmitting a packet of appliance control information to the appliances based on the stored appliance control information, said packet of appliance control information including an address portion indicating a specific appliance to be controlled and a data portion representing the appliance control information for the appliance to be controlled; and
   a plurality of appliance controller means spaced from said premises controller means but within range of said generated packet transmission for interfacing with respective appliances, each of said appliance controller means having a specific address and including:

means for receiving and translating a respective packet of appliance control information based on the designated address for controlling operation of the respective appliance; and means for generating a radio signal back to said premises controller means relating to operation of the appliance;

responsive to the radio signal back, the premises controller means generating and transmitting further packet control information to the appliance controller means for closed loop control of the appliance within the premises;

wherein the premises controller interoperates wirelessly, in both directions, with appliance controllers out of the premises controller's line of sight.

9. The system according to claim 8 wherein said appliance control means further comprises:

microprocessing means translating the packet of appliance control signals;

wherein said premises control means further comprises:

radio transmitting means for delivering the packet of appliance control information to said microprocessing means; and wherein said appliance control means further comprises:

pulse generation means operatively connected to said microprocessing means for receiving said translated packet of appliance control information and generating and transmitting a control signal to the appliance.

10. The system according to claim 8 wherein said appliance control means further includes ROM for storing various pulse sequences depending on the type of appliance to be controlled.

11. The system according to claim 8 wherein said radio transmission means further includes a antennae through which said transmitted packet of appliance control information is sent.

12. The system according to claim 8 wherein said packet of appliance control information comprises an address portion and a payload portion.

13. The system according to claim 8 wherein said radio transmission means includes means for generating a packet radio signal in the range of 2.45 Ghz to about 6.0 Ghz to said appliance control means.

14. The system according to claim 8 wherein said premises control means includes processing means including ROM which stores said appliance control information.

15. An apparatus for controlling an appliance contained within a premises comprising:

premise controller means for receiving and storing appliance control information; and radio transmission means for generating and transmitting a packet of control information to an appliance controller means spaced from said controller means but within range of said generated packet transmission for interfacing with the appliance, said appliance controller means including means for receiving and translating said packet of control information for controlling operation of the appliance and means for generating a radio signal back to said controller means relating to operation of the appliance;

the premises controller means generating and transmitting further packet control information to the appliance controller for closed loop control of the appliance within the premises;

wherein the premises controller interoperates wirelessly, in both directions, with appliance controllers out of the premises controller's line of sight.

16. The system according to claim 15 wherein said premise control means further comprises the radio transmitting means operates in the range of 2.45 Ghz to about 6.0 Ghz for delivering the packet of control information.

17. The system according to claim 15 wherein said control means further includes ROM for storing various pulse sequences depending on the type of appliance to be controlled.

18. The system according to claim 15 wherein said packet of control information includes an address portion and a payload portion.

19. The system according to claim 15 wherein said premise controller means is responsive to said radio signal back to said controller means relating to operation of the appliance for generating and transmitting further control information to said appliance controller means for closed loop control within the premises.

20. The system according to claim 15 wherein said control means includes processing means, including ROM which stores said control information.

* * * * *